No. 810,979. PATENTED JAN. 30, 1906.
F. H. RICHARDS.
MARKING MACHINE.
APPLICATION FILED APR. 28, 1903.

5 SHEETS—SHEET 3.

Witnesses
Inventor

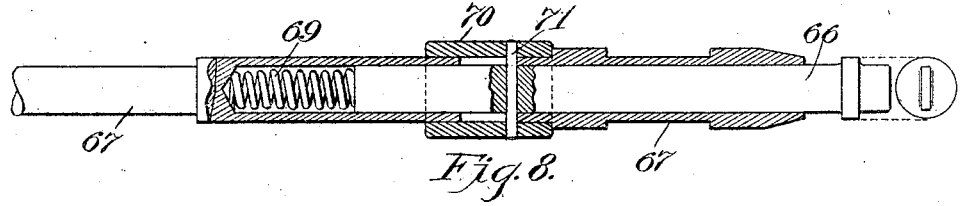
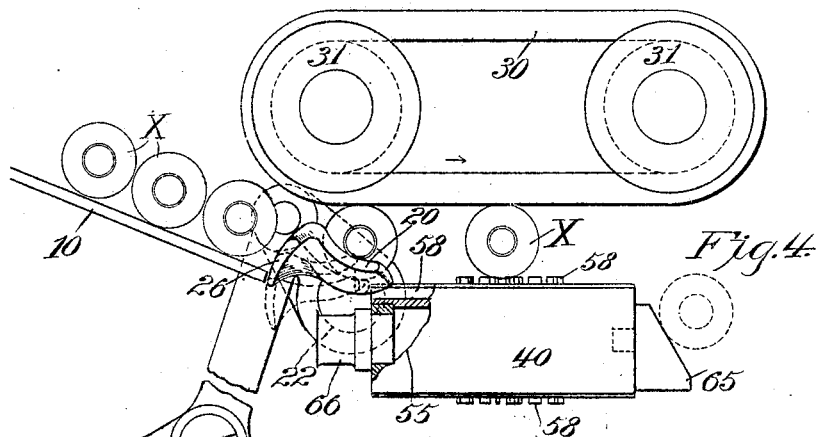
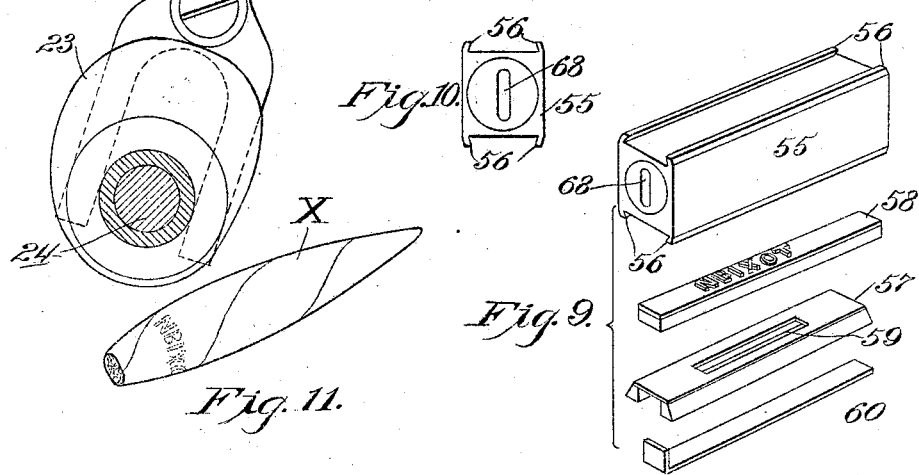

No. 810,979. PATENTED JAN. 30, 1906.
F. H. RICHARDS.
MARKING MACHINE.
APPLICATION FILED APR. 28, 1903.

5 SHEETS—SHEET 5.

Witnesses

Inventor

UNITED STATES PATENT OFFICE.

FRANCIS H. RICHARDS, OF HARTFORD, CONNECTICUT, ASSIGNOR TO AMERICAN CIGAR COMPANY, OF NEW YORK, N. Y., A CORPORATION OF NEW JERSEY.

MARKING-MACHINE.

No. 810,979. Specification of Letters Patent. Patented Jan. 30, 1906.

Application filed April 28, 1903. Serial No. 154,619.

*To all whom it may concern:*

Be it known that I, FRANCIS H. RICHARDS, a citizen of the United States, residing at Hartford, county of Hartford, and State of Connecticut, have invented certain new and useful Improvements in Marking-Machines, fully described and represented in the following specification and the accompanying drawings, forming a part of the same.

This invention relates to machines for marking articles.

The invention has been made especially with the idea of providing a machine adapted for marking cigars with lettering or a suitable design applied to the cigar circumferentially, the machine being designed to mark the cigars without injury to the wrapper, to be adaptable for marking cigars of various sizes and shapes, and to have a very high capacity. Although intended primarily for cigars, the invention may be employed for marking other articles for which it may be found applicable.

A full understanding of the invention can best be given by a detailed description of a preferred construction embodying the various features of the invention, and such a description will now be given in connection with the accompanying drawings.

Figure 1:
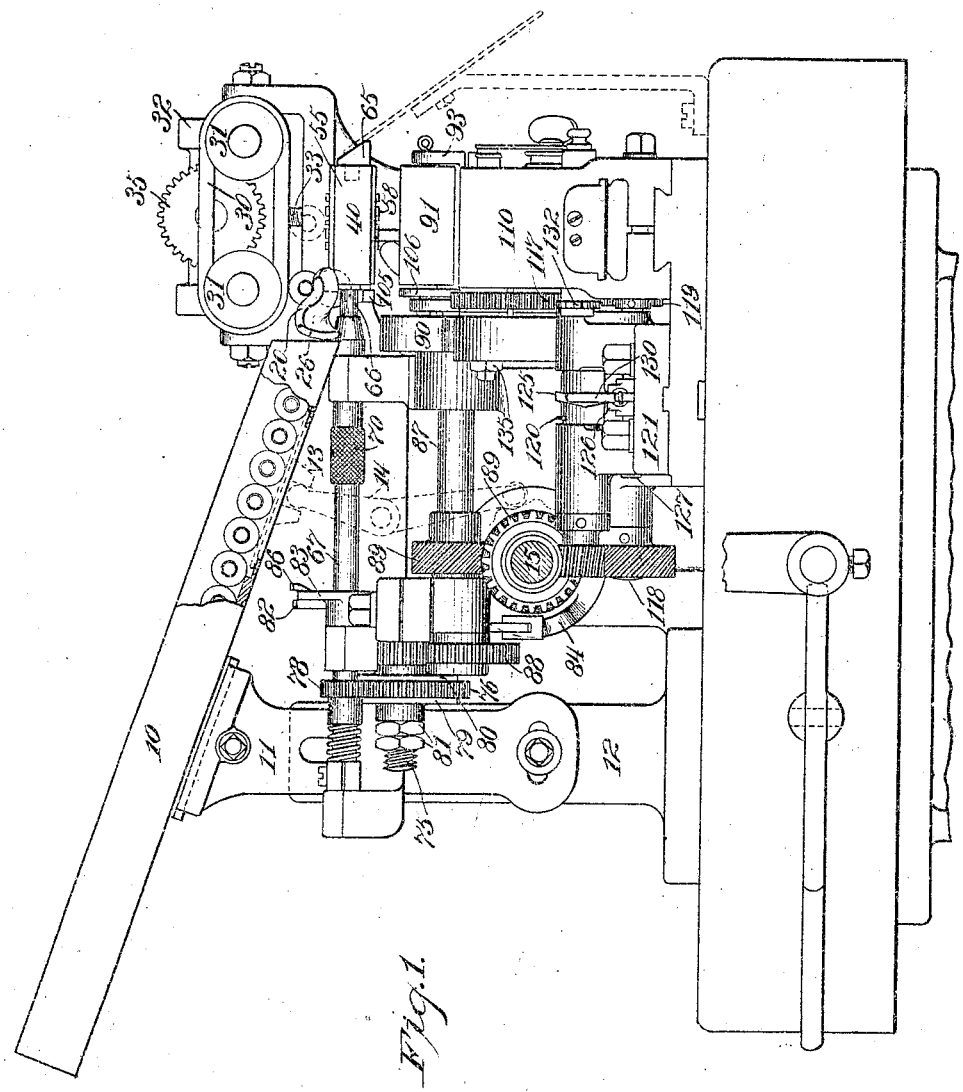
Figure 2:
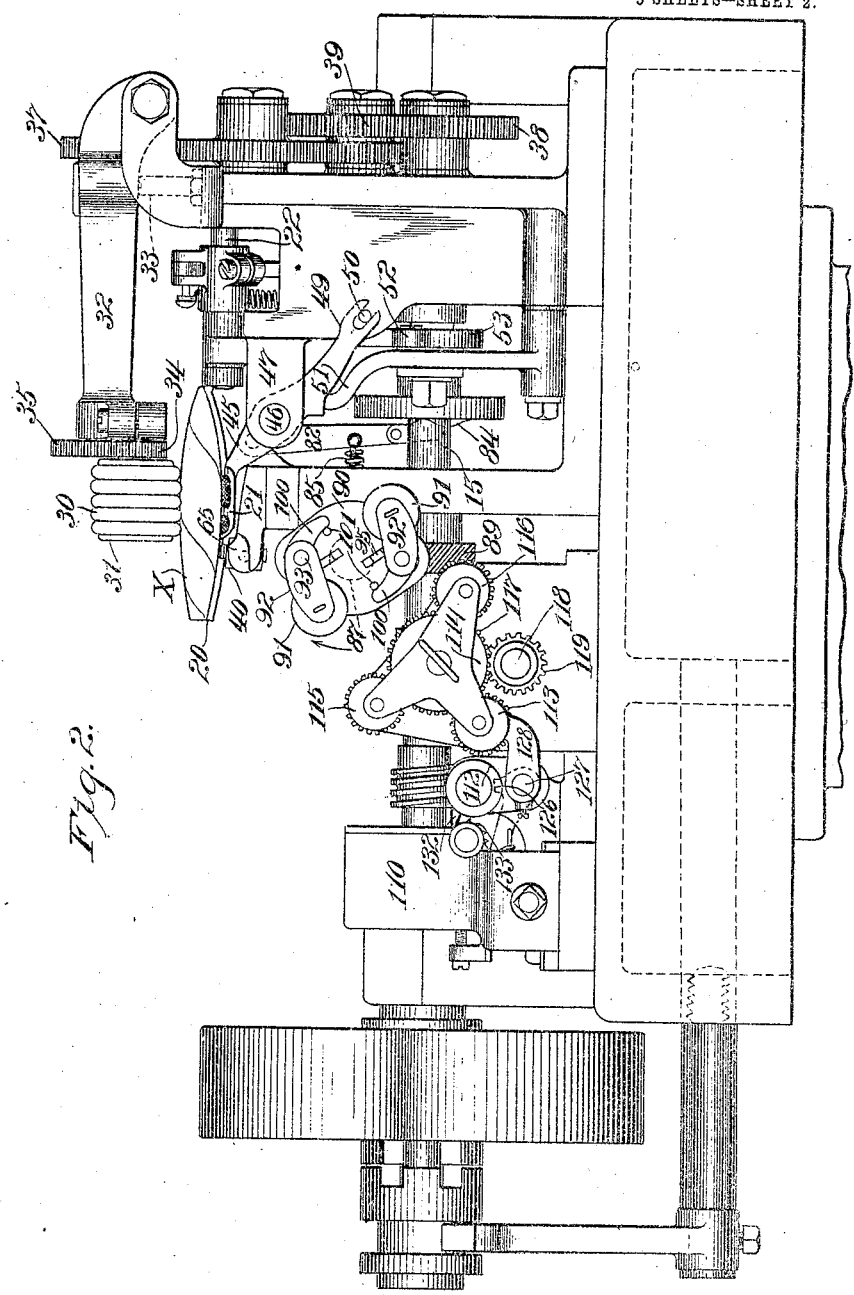
Figure 3:
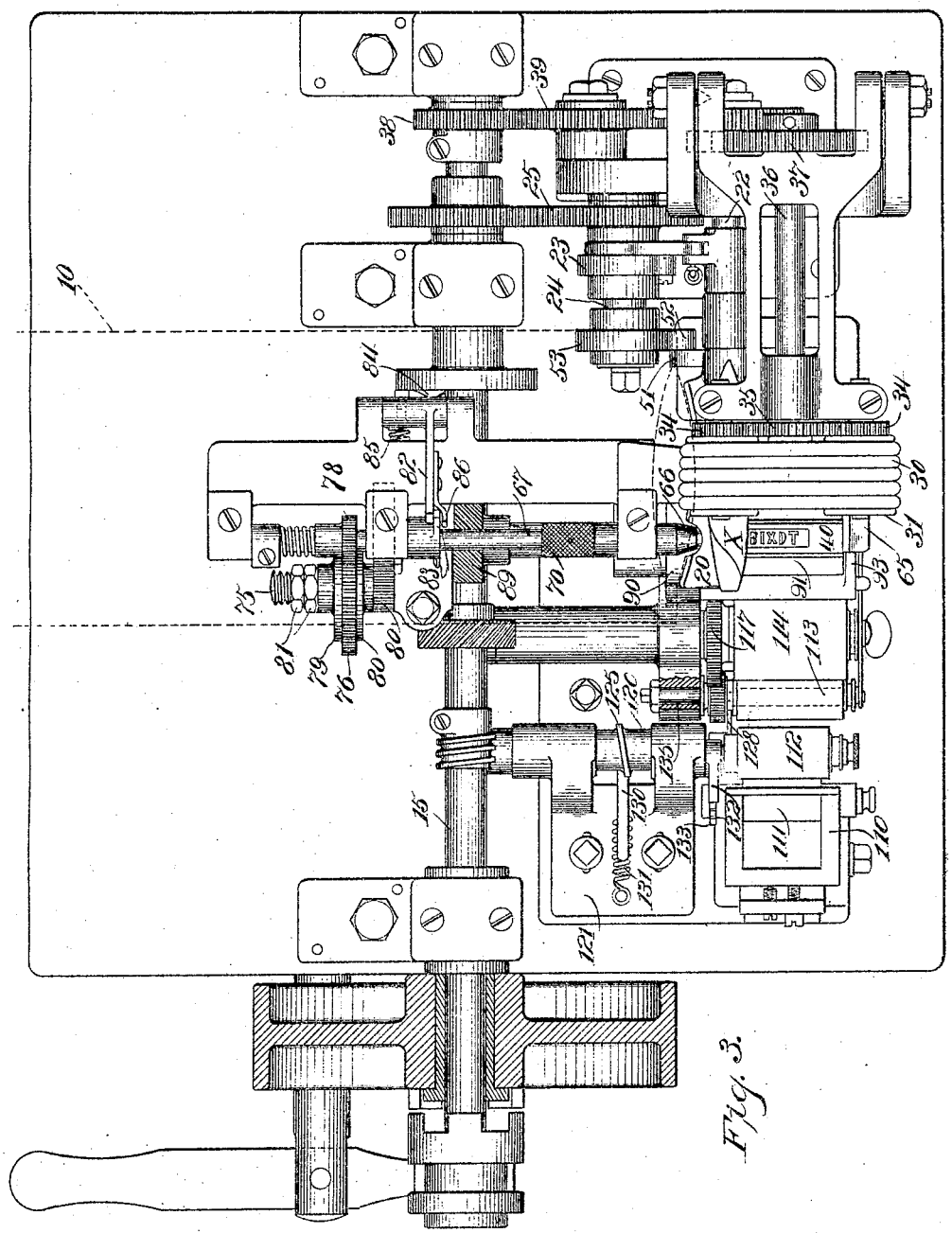
Figure 5:
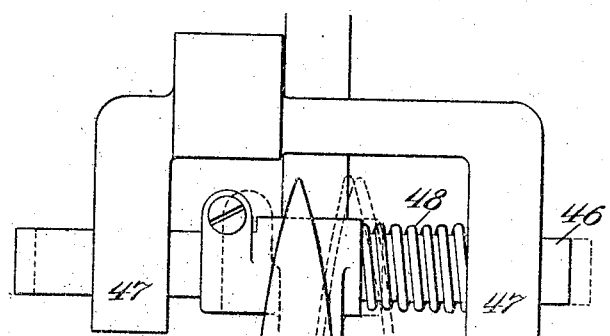
Figure 7:
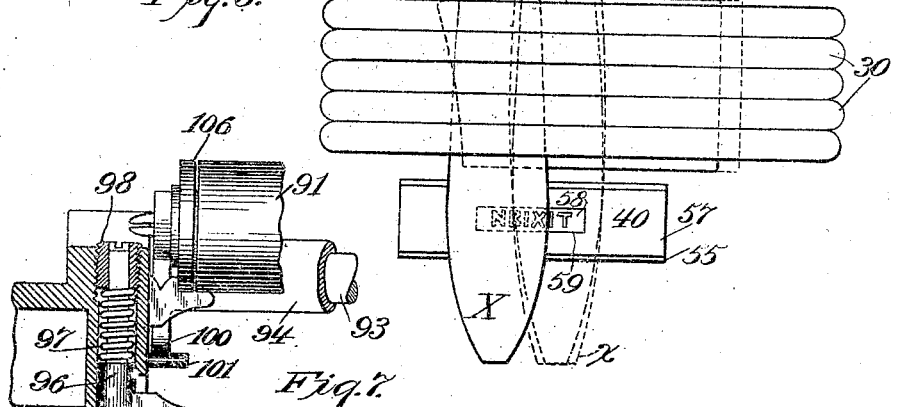
Figure 6:
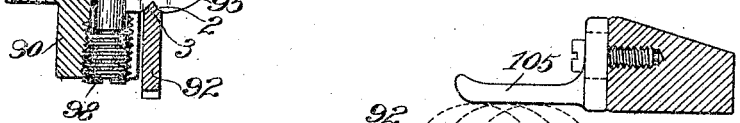

In said drawings, Figure 1 is a side view, partly in section, of such a machine. Fig. 2 is a rear view of the machine. Fig. 3 is a plan view. Fig. 4 is a detail view of the feeding and marking mechanisms. Fig. 5 is a detail plan view of the marking devices. Fig. 6 is a detail view of the mechanism for applying marking material to the marking-surfaces. Fig. 7 is a detail view, partly in section, of parts shown in Fig. 6, looking in the direction of the arrow 7 in Fig. 6. Fig. 8 is a detail sectional view of the supporting and operating spindle of the marking-head. Fig. 9 shows the marking-head in perspective and a marking-strip and parts for holding the marking-strip to the marking-head separated from the marking-head. Fig. 10 is an end view of the marking-head. Fig. 11 is a perspective view of a cigar, showing the mark as applied by the machine.

Referring to the drawings, the cigars or other articles to be marked are placed in an inclined feed-chute 10, from which they are successively advanced to the marking mechanism. The chute 10 is preferably adjustably mounted, as by being longitudinally adjustable on a support 11, which is adjustably mounted on a bracket 12. For insuring uniform downward movement of the cigars in the feed-chute the chute preferably has its bottom provided with a movable section 13, which is jogged longitudinally of the chute by means of a lever 14, vibrated by means of a cam on the main shaft 15, as shown in dotted lines on Fig. 1.

Mounted just beyond the lower end of the trough 10 is a tilting trough 20, which is oscillated from the position shown in dotted lines in Fig. 4 to the position shown in full lines in said figure and in Fig. 1 to carry a cigar which has advanced onto the trough 20 from the trough 10 into engagement with the feeding device by which the cigar is rolled over a supporting-table 21. The trough 20 is carried by a shaft 22, which is rocked to oscillate the trough between its receiving and delivering positions by means of a cam 23 on a shaft 24, which is driven from the main shaft 15 by means of gears 25. The rear face 26 of the oscillating trough 20 is formed to act as a stop for the cigars in the trough 10 as the trough 20 is making its delivery and return movements.

Any suitable feeding device may be provided for rolling the cigars over the table 21, but preferably there is provided a plurality of cushion-belts 30, mounted on rolls 31, these belts being preferably formed of rubber tubing. The rolls 31 are carried by a pivoted arm 32, which is adjustable, as by means of an adjustable stop 33, for setting the feeding-belts nearer to or farther from the table 21 for operating on cigars of different size. The rolls 31 carry gears 34, which mesh with a gear 35, carried by a shaft 36, journaled in bearings carried by the lever 32, and which carries on its other end a gear 37, by which it is driven from a gear 38 on the driving-shaft 15 through intermediates 39.

Mounted adjacent to the supporting-table 21 is a rotary marking-head 40, which is provided with a plurality of marking-surfaces which by the rotation of the head are brought successively into position to engage the surface of a cigar as the latter is rolled over the support 21 by the belts 30. The support 21 is preferably arranged so as to support the cigar only on one side of the marking-surface, as shown, and the feeding-belts 30 are preferably arranged so as to bear against only that portion of the cigar which is directly supported by the table 21. The table 21 is preferably constructed so as to provide a yielding support for the cigars. For this purpose the supporting-face of the table is preferably formed by means of a pad or pads 41, of felt or other suitable yielding material.

In marking cigars which are of such a shape that the part coming in contact with the marking-surface is of different diameter from the part coming in contact with the supporting-table there would be a tendency for the cigar to swing slightly out of parallel as it moved over the table and marking-surface. To overcome this tendency, means are provied for giving one of these parts a slight movement longitudinally of the line of movement of the cigar during the time that the cigar is moved thereover. Such movement is preferably imparted to the supporting-table, and the table is for this purpose carried by a bracket 45, mounted on a shaft 46, which is supported so as to be capable of longitudinal movement in brackets 47 and normally held in the position shown in full lines in Fig. 5, as by means of a spring 48. The bracket 45 is provided with a depending arm 49, having a forked end to engage a guide-stud 50, and thereby hold the table in position. The table is intermittently moved forward against the pressure of the spring 48 by means of a lever 51, which bears against the arm 49, said lever carrying a roll 52, which runs in contact with a cam 53 on the shaft 15. The operation will be understood from Fig. 5, in which the cigar X is shown in full lines in position as it begins to roll over the table and marking-surface, the cigar being shown as of tapering form and of larger diameter at the point of contact with the marking-surface than at the part which engages the support. If the support and marking-surface both remain stationary as the cigar is rolled thereover, the cigar would roll to a position, as indicated by dotted lines x, out of parallel with that indicated by the full lines; but by moving the support in the direction of movement of the cigar, as indicated by dotted lines in this figure, as the cigar moves thereover the cigar would come to the position indicated by the dotted lines x'—that is, a position substantially parallel with its position at the start.

The marking-head 40 may be provided with any desired number of longitudinally-extending marking-surfaces arranged circumferentially thereon. As shown, it is provided with two such surfaces and is formed by means of a block 55, formed on opposite sides with retaining-flanges 56 for securing a slide-holder 57, by which a strip 58, bearing a marking-surface, may be secured to the block 55; the holder 57 being formed with a top opening 59, through which the marking-surface projects. A bottom strip 60 is preferably provided to lie beneath the marking-strip 58 when the latter is in the holder and for holding the strip in place as the holder is slipped into position on the block. The marking-strip and marking-surface may be of any suitable material, but preferably of a yielding material, as rubber. The marking-surface is shown in the drawings as formed to mark the cigars with a line of letters; but it will be understood that it may be of other form, as for applying a double line of letters or words or for applying other desired design or mark to the cigar.

To enable the marking-head to be readily removed from the machine, it is supported on one end by means of a pin extending from a bracket 65 and at the other end by means of a spindle 66, mounted in a hollow shaft 67. The end of the spindle is formed to fit and extend into a slot 68 in the inner end of the block 55, and the spindle is mounted in the shaft so as to be capable of being retracted against the tension of a spring 69 to release the block 55, it being normally held by the spring 69 in position to support the block. For withdrawing the spindle a sliding sleeve 70 is preferably provided on the shaft 67, having a pin 71 extending through the spindle 66 and through slots in the shaft 67, as shown in Fig. 8.

The shaft 67 is intermittently rotated for rotating the marking-head and bringing its marking-surfaces successively into marking position. As shown, it is rotated from a constantly-rotating shaft 75, which carries a gear 76, meshing with a pinion 78 on the shaft 67. The gear 76 is held between friction-disks 79 and 80, carried by the shaft 75 and mounted to rotate therewith, one of such disks 79 being adapted to be set, as by means of nuts 81, to bear with a greater or less pressure on the face of the gear 76. The shaft 67 will thus be under a constant tendency to rotate; but its rotation is controlled by means of a stop-lever 82, normally in position to engage one or the other of two studs 83, carried by and extending in opposite directions from the shaft 67. For each oscillation of the feeding-trough 20 the stop-lever 82 is moved to release the shaft 67 and permit it to make a half-revolution, the stop-lever returning after each movement in time to engage the next stud 83. The stop-lever 82 is operated by means of a face-cam 84 on the shaft 15 acting against the pressure of a spring 85. The stop-lever 82 is preferably provided with a spring 86, bent to form, with the end of the lever, a jaw for receiving the studs 83, and thereby lessening the shock of the stopping of the shaft 67 and marking-head and holding the shaft and marking-head while a cigar is being marked. The shaft 75 is driven through a shaft 87, which carries a gear 88, meshing with a pinion on the shaft 75, the shaft 87 being driven by bevel-gears 89 from the shaft 15.

By providing a marking-head having a plurality of marking-surfaces which are successively moved into marking position the marking material may be applied to the marking-surfaces while they are out of marking position and while a cigar is being marked by another of the marking-surfaces. Any suitable means may be provided for applying marking material to the marking-surfaces; but there is preferably provided, as shown, a rotary head 90, carried by the shaft 87, which head carries one or more, and preferably a plurality, of applying-rolls 91, such rolls being carried into contact with a device for supplying marking material thereto and then into contact with the marking-surface to which the marking material is to be applied. These applying-rolls 91 are preferably yieldingly mounted on the head 90, as by being carried each by two trailing arms 92, pivotally mounted on a pin 93, projecting from the head 90. The arms 92 for each roll 91 are connected by a sleeve 94, which pivots on the pin 93, and the arms are pressed outward by means of spring pushing devices 95, carried by plungers 96, set into openings extending through the head 90 and pressed, as by springs 97, to move the pushing-pieces 95 to press the rolls outward. Adjustable stops 98 are preferably provided for the plungers 96 and adjustable plugs 98 for adjusting the tension of the springs 97. (See Figs. 6 and 7.) Rearwardly-extending arms 100 are provided for engaging pins 101 to limit the outward movement of the rolls 91. The pushing-pieces are preferably formed with notches, as shown at 2, and engage beveled shoulders or portions 3 of the inner arms 92, and thereby act as catches for holding each sleeve 94, with its pair of arms 92, on the pin 93. This construction enables each of the applying-rolls 91 to be readily removed from the head 90. It will be seen that by this construction as each roll is brought into contact with the marking-surface to which it is to apply marking material the roll is free to yield, and thereby to move in contact with the whole breadth of the marking-surface. For securing contact of the applying-rolls with the marking-surface with uniform pressure there is preferably provided a cam 105 in position to engage disks 106, mounted at the inner ends of the roll 91. This cam being formed with a plane surface will cause the rolls to move in a plane during the time that they are moving in contact with the marking-surfaces. The operation of these parts will be clearly understood from Figs. 6 and 7.

Any suitable means may be provided for supplying marking material to the applying-rolls. As shown, there is provided a fountain 110 for the marking material, having a fountain-roll 111, from which the marking material is taken by means of a transferring-roll 112, by which it is applied to a distributing-roll 113. The distributing-roll 113 coacts with a central distributing-roll 114, with which coöperate other distributing-rolls 115 and 116, the rolls 114 and 116 being positioned so as to be engaged by the applying-rolls 91 as the latter revolve with the cam 90. The shafts of the rolls 113 and 115 and 116 carry gears meshing with a gear 117 on the shaft of the roll 114, which latter roll is driven from a shaft 118, which carries a pinion 119, meshing with a gear 117. The transferring-roll 112 is mounted to move between and alternately engage the fountain-roll 111 and the distributing-roll 113, being for this purpose carried by a crank-pin eccentrically mounted on a shaft 120, journaled in bearings on an adjustable support 121, as shown in Fig. 3. The shaft 120 also carries a cam 125, which engages with a projection 126 (shown in dotted lines in Fig. 2) on a shaft 127, which carries a finger 128, normally in engagement with a grooved collar on the shaft of the distributing-roll 113, as shown in Figs. 2 and 3. The shaft 127 also carries a lever 130, which may be moved against the tension of a spring 131 to carry the arm 128 out of engagement with the collar 129. The fountain-roll 111 is intermittently rotated by means of a pawl 132 on the crank-pin, which carries the roll 112, this pawl engaging a ratchet-wheel 113 on the shaft of the fountain-roll.

The distributing-rolls 113, 115, and 116 are preferably mounted so as to be capable of slight adjustment with relation to the roll 114. For this purpose they are shown as journaled on pins extending eccentrically from studs 135, set into the machine-frame, so that by slightly turning such studs the distributing-rolls 113, 115, and 116 may be adjusted toward or from the roll 117.

It will be understood that the invention is not to be limited to the exact construction to which the foregoing description has been mainly confined, but that the invention includes changes and modifications in such construction within the claims.

What I claim is—

1. In a marking-machine, the combination of a normally stationary marking-surface, means for rolling articles against the marking-surface, and means for shifting the marking-surface for supplying marking material thereto, substantially as described.

2. In a marking-machine, the combination of a marking-surface, means for rolling articles against the marking-surface while the latter is stationary, and means for applying marking material to the marking-surface, substantially as described.

3. In a marking-machine, the combination of a plurality of marking-surfaces, means for bringing said marking-surfaces successively into and holding them stationary in marking position, means for rolling articles against said marking-surfaces when in marking position, and means for applying marking material to the marking-surface when not in marking position, substantially as described.

4. In a marking-machine, the combination of a plurality of marking-surfaces, means for moving said marking-surfaces successively into and holding them stationary in marking position, means for rolling articles against said marking-surfaces when in marking position, and means for preparing the marking-surfaces for marking when not in marking position, substantially as described.

5. In a marking-machine, the combination of a marking-head having a plurality of marking-surfaces, means for intermittently rotating said head to bring the marking-surfaces successively into marking position, means for rolling articles against said marking-surfaces when in marking position, and means for preparing the marking-surfaces for marking when not in marking position, substantially as described.

6. In a marking-machine, the combination of a marking-surface, a moving surface opposed to the marking-surface for rolling articles against the marking-surface, means for shifting the marking-surface for supplying marking material thereto, and means for supplying a succession of articles in position to be rolled against the marking-surface by said moving surface, substantially as described.

7. In a marking-machine, the combination of a normally stationary marking-surface, means for rolling articles against the stationary marking-surface, means for shifting the marking-surface for supplying marking material thereto, and means for supplying to said rolling means a succession of articles to be marked, substantially as described.

8. In a marking-machine, the combination of a normally stationary marking-surface, means for rolling articles against the stationary marking-surface, means for applying marking material to the marking-surface, an oscillating feed-trough for feeding articles to said rolling means, and means for supplying articles to the feed-trough, substantially as described.

9. In a marking-machine, the combination of a marking-surface, a moving surface opposed to the marking-surface for rolling articles against the marking-surface, a feed-chute 10, and an oscillating trough 20 for receiving the articles from the chute and moving them into position to be engaged by the moving surface, substantially as described.

10. In a marking-machine, the combination of a marking-surface, a plurality of endless cushion-belts for rolling articles against the marking-surface, and means for supplying a succession of articles to be marked in position to be engaged by said belts, substantially as described.

11. In a marking-machine, the combination of a marking-surface, a plurality of endless cushion-belts for rolling articles against the marking-surface, and means for adjusting the belts toward and from the marking-surface, substantially as described.

12. In a marking-machine, the combination of a support, means for rolling articles against the support, a marking-surface adjacent to the support and opposed to the rolling means in position to engage the articles as they are rolled against the support, and means for shifting the marking-surface independently of the support for supplying marking material thereto, substantially as described.

13. In a marking-machine, the combination of a support, means for rolling articles against the support, and a marking-surface supported adjacent to the support and opposed to the rolling means to engage the articles beyond the line of engagement of the rolling means and of the support therewith, substantially as described.

14. In a marking-machine, the combination of a supporting member, means for rolling articles against said supporting member, a member having a marking-surface in position to engage the articles as they are rolled against the supporting member, and means for moving one of said members longitudinally of the direction of movement of the articles thereagainst, while the article is being rolled thereagainst, substantially as described.

15. In a marking-machine, the combination of a support, means for rolling articles against the support, a marking-surface in position to engage the articles as they are rolled against the support, and means for moving the support longitudinally of the direction of movement of the articles thereagainst while an article is being rolled thereagainst, substantially as described.

16. In a marking-machine, the combination of a support, means for rolling articles against the support, a marking-surface in position to engage the articles as they are rolled against the support, and means for moving the support longitudinally of and in the direction of movement of the articles thereagainst while an article is being rolled thereagainst, substantially as described.

17. In a marking-machine, the combination of a yielding support, means comprising a member moving past the support for rolling articles against the support, and a marking-surface supported adjacent to the support and opposed to said member in position to engage the articles as they are rolled against the support, substantially as described.

18. In a marking-machine, the combination of a support having an article-engaging surface formed of felt or the like, means comprising a member moving past the support for rolling articles against the support, and a marking-surface supported adjacent to the support and opposed to said member in position to engage the articles as they are rolled against the support, substantially as described.

19. In a marking-machine, the combination of a yielding support, means comprising a yielding article-engaging member moving past the support for rolling articles against the support, and a marking-surface supported adjacent to the support in position to engage the articles as they are rolled against the support, substantially as described.

20. In a marking-machine, the combination of a marking-head having a plurality of marking-surfaces adapted to be rotated to bring the marking-surfaces successively into marking position, means for rolling articles against the marking-surfaces when in marking position, a constantly-rotating member, friction driving means between said member and the marking-head, and stop mechanism for permitting intermittent rotation of the marking-head, substantially as described.

21. In a marking-machine, the combination of a normally stationary marking-surface, means for rolling articles against the stationary marking-surface, means for shifting the marking-surface into position to have marking material applied thereto, and a revolving rotatable roll for applying marking material to the marking-surface, substantially as described.

22. In a marking-machine, the combination of a marking-surface, means for rolling articles against the marking-surface, means for shifting the marking-surface into position to have marking material applied thereto, and a yieldingly-mounted revolving rotatable roll for applying marking material to the marking-surface, substantially as described.

23. The combination with a marking-head, of a support for one end of the marking-head, an endwise-movable member for supporting the other end of the marking-head, means for rotating said member, and means for holding said member normally in supporting position, substantially as described.

24. A marking-head formed of a body portion 55 having a pair of retaining-flanges 56, a holder 57, and a bottom strip 60, substantially as described.

FRANCIS H. RICHARDS.

Witnesses:
　FRED. J. DOLE,
　JOHN O. SEIFERT